United States Patent
Gnesin et al.

(10) Patent No.: US 6,770,856 B2
(45) Date of Patent: Aug. 3, 2004

(54) REFSICOAT HEAT RESISTANT MATERIAL AND HIGH-TEMPERATURE ELECTRIC HEATERS USING SAID MATERIAL

(75) Inventors: Boris Abramovich Gnesin, Moscow (RU); Pavel Artemovich Gurzhiyants, Chernogolovka (RU)

(73) Assignee: Institut Fiziki Tverdogo Tela Rossiiskoi Akademii Nauk, Chernogolovka (RU)

( * ) Notice: Subject to any disclaimer, the term of this patent is extended or adjusted under 35 U.S.C. 154(b) by 55 days.

(21) Appl. No.: 10/203,772
(22) PCT Filed: Jan. 30, 2001
(86) PCT No.: PCT/RU01/00034
§ 371 (c)(1), (2), (4) Date: Oct. 3, 2002
(87) PCT Pub. No.: WO01/61421
PCT Pub. Date: Aug. 23, 2001

(65) Prior Publication Data
US 2003/0106888 A1 Jun. 12, 2003

(30) Foreign Application Priority Data
Feb. 17, 2000 (RU) ........................ 2000103649

(51) Int. Cl.$^7$ .............................................. H05B 3/10
(52) U.S. Cl. ...................................... 219/548; 219/553
(58) Field of Search ................................ 219/548, 583, 219/541; 423/344, 324; 501/92, 96.3

(56) References Cited

U.S. PATENT DOCUMENTS 4,690,872 A * 9/1987 Kato et al. .................. 428/446
4,970,179 A    11/1990 Petrovic et al.

(List continued on next page.)

FOREIGN PATENT DOCUMENTS

DE    3519437    12/1985
GB    2015910    9/1979

(List continued on next page.)

OTHER PUBLICATIONS

English translation of the claims of RU 2094513 dated Oct. 27, 1997.

(List continued on next page.)

Primary Examiner—Edward K. Look
Assistant Examiner—Vinod D. Patel
(74) Attorney, Agent, or Firm—Ladas & Parry

(57) ABSTRACT

The present invention relates to the provision of materials intended for use in an oxidative medium at high temperatures, including the manufacture of high-temperature electric heaters, parts, sensors and tools operating at temperatures of up to 1900° C. and higher. On the basis of suicides—solid solutions $(Mo,W)_5Si_3$ and $(Mo,W)Si_2$ as well as Novotný phase $(Mo,W)_5Si_3C$ containing molybdenum and tungsten, a heat-resistant material is proposed, which makes it possible to produce parts fully made therefrom and a broad range of other heat-resistant materials for the provision of protective coatings and soldered joints: "REFSIC" composite materials, carbon, silicon carbide materials, refractory metals and their alloys. Extensive property-varying potentialities by controlling the phase composition, a large diversity of the structural features of single-layered and multilayered protective coatings make it possible to control the heat-resistance, resistance to thermal shocks and resistance to combined thermal deformations of the coating as such and of parts produced by soldering other high-temperature materials with the help of the proposed heat-resistant material. The proposed electric heaters can have working parts and current lead-in wires made from the above-mentioned high-temperature materials, having soldered joints and protective coatings prom the proposed material in different combinations of materials and heater designs.

24 Claims, 1 Drawing Sheet

U.S. PATENT DOCUMENTS

Figure 1:
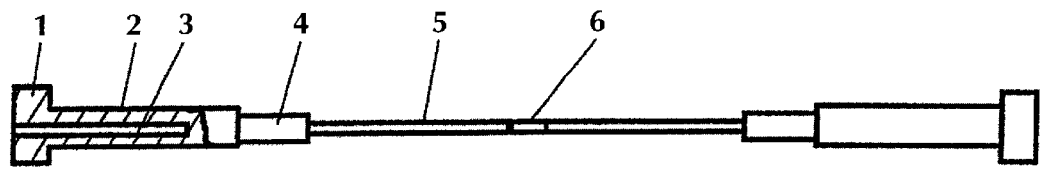

| | | | | |
|---|---|---|---|---|
| 5,064,789 A | * | 11/1991 | Petrovic et al. | 501/96.3 |
| 5,069,841 A | * | 12/1991 | Petrovic et al. | 264/86 |
| 5,382,553 A | * | 1/1995 | Petrovic | 501/92 |
| 5,470,506 A | * | 11/1995 | Tanigami et al. | 252/520.22 |
| 5,708,408 A | * | 1/1998 | Sundberg | 338/306 |
| 5,786,565 A | * | 7/1998 | Willkens et al. | 219/260 |
| 5,887,241 A | * | 3/1999 | Jayashankar et al. | 419/14 |
| 5,948,306 A | * | 9/1999 | Konishi et al. | 219/548 |
| 6,008,479 A | * | 12/1999 | Jiang et al. | 219/553 |
| 6,197,247 B1 | * | 3/2001 | Rodriguez et al. | 264/656 |
| 6,211,496 B1 | * | 4/2001 | Uchiyama et al. | 219/548 |
| 6,300,265 B1 | * | 10/2001 | Rodriguez et al. | 501/96.3 |

FOREIGN PATENT DOCUMENTS

| | | |
|---|---|---|
| RU | 2066514 | 9/1996 |
| RU | 2094513 | 10/1997 |
| RU | 2160790 | 12/2000 |
| SU | 1685752 | 10/1991 |
| SU | 1694552 | 11/1991 |

OTHER PUBLICATIONS

English translation of the abstract of DE 3519437 dated Dec. 5, 1985.

English translation of the claims of RU 2066514 dated Sep. 10, 1996.

English translation of the claims of RU 2160790 dated Dec. 20, 2000.

G.B. Cherniack, et al. "High–Temperature Behavior of $MoSi_2$ and $Mo_5Si_3$" Journal of American Ceramic Society, vol. 47, No. 3, pp. 136–141, (1964).

* cited by examiner

REFSICOAT HEAT RESISTANT MATERIAL AND HIGH-TEMPERATURE ELECTRIC HEATERS USING SAID MATERIAL

The invention relates to the provision of materials for use in electric heaters, parts, sensors and tools operating in oxidative media at 1000–1900° C. The proposed heat-resistant material is suitable for manufacturing individual parts, high-temperature protective coatings and high-temperature soldered joints of part components which, in their turn may be manufactured from other high-temperature materials: refractory materials and alloys based thereon, carbon and silicon-carbide materials, as well as composite materials based on suicides of refractory metals "REFSIC". The proposed heat-resistant material may be used for producing composite materials and articles therefrom with the use of other high-temperature materials in various combinations.

Known in the art are silicon carbide electric heaters with a known protective coating material, described in [SU 1694552 A1, C04B 35/56]. The protective coating is produced by applying a suspension based on molybdenum disilicide, followed by roasting. Introduced into the suspension are 75–85% of molybdenum disilicide and 15–25% of zirconium oxide stabilized with yttrium oxide, the ratio of these oxides being 9:1. The same ratio of the components is preserved almost unmodified in the material of finished protective coating which may have a thickness of up to 200–250 $\mu$m. The coating of a greater thickness peels off and degrades in the course of temperature cycling; if the thickness of the coating is smaller, the service life of the coating material and of the whole heater under oxidative conditions at high temperatures is noticeably reduced.

A disadvantage of such material is its low stability. The thickness of the coating cannot be increased without formation of cracks because of a considerable difference in the values of thermal expansion coefficients of silicon carbide ($\alpha=(4-4.6)\times10^{-6}$ 1/deg [V. V. Vikulin, Structural and Functional Ceramics, Obninsk, 1997, Institute of Nuclear Power (in Russian)]), which constitutes the basis of the heater, and of tetragonal molybdenum disilicide ($\alpha_a==8.2\times10^{-6}$ 1/deg, $\alpha_c=9.4\times10^{-6}$ 1/deg), which, in its turn, constitutes the basis of the coating material. The oxide phase in the coating has a still higher thermal expansion coefficient than molybdenum disilicide has. As a result, the coating cracks easily under the effect of temperature cycling at a rate higher than 20° C./second, and the heater fails.

Known in the art are silicon carbide electric heaters comprising a known heat-resistant protective coating material produced by powder metallurgy techniques [SU 1685752, H05B 3/14]. The coating material comprises a sublayer of molybdenum silicides $Mo_3Si$ and $Mo_5Si_3$ having a thickness of 180–220 $\mu$m and an outer sublayer of molybdenum disilicide ($MoSi_2$) having a thickness of 150–250 $\mu$m. The total thickness of the protective coating layers cannot be increased to exceed about 500 $\mu$m because of crack formation. To increase the service life at 1500–1600° C. and under temperature cycling conditions in an oxidative medium, the coating comprises two layers: a sublayer from lower molybdenum suicides $Mo_3Si$ and $Mo_5Si_2$ contains them in the ratio of 1:5, and a layer based on molybdenum disilicide further comprises 20–30% of an oxide filler from a mixture of zirconium and yttrium oxides in the ratio of 95:5 and sodium aluminate with the following ratio of the components in the oxide filler: mixture of zirconium and yttrium oxides, 50–90%; sodium aluminate, 10–50% by weight.

The main disadvantage of the material in the form of a two-layer coating is its low stability upon temperature cycling at the rate of heating and cooling higher than 20° C./second and also at temperatures of 1600–1700° C. and higher. The thickness of the coating, limiting its service life, increased over SU 1694552 A1 to 470 $\mu$m, cannot be further increased markedly without formation of cracks because of considerable difficulties in the thermal expansion coefficients of the silicon carbide, the sublayer from lower molybdenum silicides and the layer of molybdenum dicilicide. This circumstance limits the stability of the coating material and of the whole electric heater under temperature cycling conditions, especially at high rates thereof.

It is known to use molybdenum dicilicide [GB 2015910 A] as a cement for joining carbon articles.

The main disadvantage of molybdenum disilicide used for cementing together carbon articles is low stability of the cemented joint. Under temperature cycling conditions, cracks are easily formed on the thus cemented articles because of a large difference in the thermal expansion coefficient between molybdenum disilicide and carbon materials.

It is known to use an eutectic of molybdenum suicides $MoSi_2+Mo_5Si_3$ as a high-melting solder for soldering refractory metals [G. B. Cherniack, A. G. Elliot, High-temperature behavior of $MoSi_2$ and $Mo_5Si_3$, Journal of the American Ceramic Society, vol. 47, No. 3, pp. 136–141.a].

The main disadvantage of the eutectic used for soldering is small stability of the joint under temperature cycling conditions, this being connected with easy formation of cracks in soldered joints when their thickness exceeds 0.2 mm.

A high-temperature composite material is known [U.S. Pat. No. 4,970,179, NPC 501-92], consisting of a silicide matrix and silicon carbide dispersed therein. Molybdenum disilicide occupies 50–90 mole percent of the matrix and the remaining portion thereof is occupied by at least one refractory silicide selected from the group consisting of $WSi_2$, $NbSi_2$, $TaSi_2$, $Mo_5Si_2$, $W_5Si_3$, $Nb_5Si_3$, $Ta_5Si_3$, $Ti_5Si_3$, $TiSi_2$, $CrSi_2$, $ZrSi_2$, $YSi_2$. Silicon carbide occupies 10–30 volume percent and is in the form of submicron powders or whiskers (elongated single crystals) or a mixture of these forms consisting, mainly, of particles with a diameter of 0.1–2.0 $\mu$m. As pointed out in the specification, an insignificant amount of $(Mo,W)Si_2$ solid solution may be present in the material.

The main disadvantages of this composite material are: low resistance to crack formation and subsequent degradation under temperature cycling conditions with rates higher than 20° C./second in connection with high the content of molybdenum disilicide in the material. Attempts to use this material as a solder will inevitably lead to degradation of the submicron particles of silicon carbide present in the material.

The prior art most relevant to the proposed invention (prototype) is the known composite high-temperature and heat-resistant material "REFSIC" [RU 2160790 C2, C22C 29/18, H05B 3/14, C04B 35/58] comprising silicon carbide and disilicides of molybdenum and tungsten in the form of $MoSi_2$, $WSi_2$, $(Mo,W)Si_2$, $Mo_5Si_3$, $W_5Si_3$, $(Mo,W)Si_3$ and/or $Mo_5Si_3C$ and/or $(Mo,W)_5Si_3C$ phases with the following ratio of the components (vol. %): $Mo_5Si_3$ and $W_5Si_3$ and/or $(Mo,W)_5Si_3$ and/or $(Mo,W)_5Si_3C$ and/or $Mo_5Si_3C$, 15-85; tungsten and/or molybdenum disilicides $WSi_2$ and $MoSi_2$ and/or $(Mo,W)Si_2$, up to 55; silicon carbide, 2-85; the content of molybdenum and tungsten in the total mass of the refractory metals in the silicide phases of the material is in the ration (in wt. %): Mo, 7-80; W, 20-93.

The main disadvantages of the prototype material are connected with difficulties in using thereof for providing soldered joints and protective coatings due to the presence in it of skeleton (coherent) structures composed of grains of silicon carbide, whose volume fraction may reach 85%. It is just the cohesion of silicon carbide grains in the "REFSIC" material that provides its heat resistance up to temperatures of 2000° C. and higher. However, it is just the cohesion of the silicon carbide skeleton that rules out the possibility of complete melting of the "REFSIC" material at temperatures below 2000° C., most often required in soldering. It is practically inexpedient to remelt "REFSIC" materials for subsequent casting in molds: melting, as a rule, is incomplete, occurs within a wide temperature range (over 200° C.). The obtained melt after crystallization will not be the "REFSIC" material. Besides, the concentration of disilicides in "REFSIC" materials, limited to 55 vol. %, not always allows obtaining the maximum high corrosion resistance in an oxidative medium in a wide range of temperatures (heat resistance), including temperatures of 1200–1600° C. A relatively narrow spectrum of phase and chemical composition in "REFSIC" materials not always makes it possible to match the thermal expansion coefficients of the coating and base material, of the soldered joint material and materials joined by soldering.

The technical result of the proposed invention consists in the provision of a heat-resistant material which may be used both for manufacturing separate parts completely made from this material and for applying a protective coating to high-temperature materials based on silicides of refractory metals and silicon carbide "REFSIC", to carbon, silicon carbide materials, refractory materials and their alloys, and also to composite materials and articles therefrom, produced from the above-said materials by soldering with a melt of such refractory material. The proposed heat-resistant material which comprises silicides—solid solutions of refractory metals with a high heat resistance and resistance to thermal shocks, this being ensured by the indicated phase composition of the material, by the possibility of obtaining heat-resistant materials with different ratio of the main phases (silicides of refractory metals, suicides of other metals and oxides), ensures high fluidity in the molten state within a wide range of compositions. Unlike the prototype material, the proposed material, when used, in many cases generally does not contain silicon carbide does not contain silicon carbide grains predominantly bound at lengths on the order of 1 mm and more, and absolutely does not contain phases of pure carbon. In the proposed "REFSICOAT" material, silicon carbide, if present, plays the role of a filler which is introduced by no means in all the cases and helps to match the thermal expansion coefficients of the materials joined by soldering and of the solder and/or of the base material and coating material.

The essence of the invention is that the heat-resistant material comprising molybdenum and tungsten silicides $Me_5Si_3$ and $MeSi_2$ and silicon carbide is characterized in that it comprises silicides in the form of solid solutions $(Mo,W)_5Si_3$, $(Mo,W)_5Si_3C$ and $(Mo,W)Si_2$ with the following ratio of the components (vol. %):

$(Mo,W)_5Si_3$ and/or $(Mo,W)_5Si_3C$ 5-98, $(Mo,W)Si_2$ 2-95, the molybdenum and tungsten ratio in the total mass of the refractory metals being within (wt. %)

Mo 2-90, w 10-98, the material comprising silicon carbide 0-55 vol. %.

The heat-resistant material may further comprise silicide phases $Mo_5Si_3$ and/or $W_5Si_3$ and/or $Mo_5Si_3C$ in a total amount of 0–90% of the total volumetric content of (Mo,W)$_5$Si$_3$ and/or (Mo,W)$_5$Si$_3$C phases, with a total volumetric content of $Mo_5Si_3$, $W_5Si_3$, $MO_5Si_3C$, $(Mo,W)_5Si_3$ phases of 5-98 vol. % or of the $MoSi_2$ and/or $WSi_2$ phase in a total amount of 0–90% of the volumetric content of the (Mo,W)$Si_2$ phase, with a total volumetric content of the $MoSi_2$, $WSi_2$ and $(W,Mo)Si_2$ disilicides of 2-95 vol. %.

The heat-resistant material may further comprise rhenium in an amount of 0–30 wt. % in at least one of the silicide phases $Mo_5Si_3$, $W_5Si_3$, $(Mo,W)_5Si_3$, $(Mo,W)_5Si_3C$, $Mo_5Si_3C$, $MoSi_2$, $WSi_2$, $(Mo,W)Si_2$.

Further, the heat-resistant material may comprise at least in one of the silicide phases $Mo_5Si_3$, $W_5Si_3$, $(Mo,W)_5Si_3$, $MoW_5Si_3C$, $MoSi_2$, $WSi_2$, $(Mo,W)Si_2$ one or more elements from the group comprising tantalum, niobium, titanium, zirconium, hafnium, with the following content of these metals, wt. %: Ta, 0-28; Nb, 0-18; Ti, 0-15; Zr, 0-19; Hf, 0-26. Near the upper limits of the indicated concentrations suicides of the above-cited metals may be present.

Further, the heat-resistant material may comprise at least one of the elements which actively bind oxygen: boron, aluminum, germanium, sodium, potassium, cesium, magnesium, calcium, barium, strontium, scandium, yttrium, lanthanum, and/or lanthanoids, manganese, the total amount of these elements being within 0–12 wt. % of the weight of the entire heat-resistant material, and they are predominantly in the form of simple or complex oxides, including silicates, in silicate systems.

Further, the heat-resistant material may comprise at least one element from the group comprising vanadium, chromium, iron, nickel and cobalt in a total amount of 0–5% of the weight of the entire material, said elements being in the form of their simple and/or complex oxides, including silicates, and/or in the form of alloys of these elements with silicon and/or with at least one of the following metals: tungsten, molybdenum, rhenium, tantalum, niobium, titanium, tantalum, zirconium and hafnium.

Further, the heat-resistant material may contain grains of silicides having a cross-section not greater than 80 µm.

Further, the heat-resistant material may be two-layered or multilayered, with layers differing in the chemical composition, phase composition, and structure.

Further, the heat-resistant material may be embodied in the form of a coating or soldered joint for components of a part from refractory metals or alloys and/or carbon and silicon carbide materials and/or composite materials comprising suicides of refractory metals and silicon carbide, and its total thickness is within 0.02–10.0 mm.

Further, the heat-resistant material may have an outer silicate layer containing 40–99.9 wt. % of silicon oxides, and also 0.1–60 wt. % in the sum of oxides of at least one of the following group of elements: boron, germanium, aluminum, zinc, bismuth, lithium, sodium, potassium, cesium, magnesium, calcium, strontium, barium, scandium, yttrium, lanthanum and/or lanthanoids, titanium, zirconium, hafnium, tantalum, niobium, vanadium, chromium, manganese, iron, nickel, cobalt, molybdenum, tungsten and rhenium.

Further, the heat-resistant material may be embodied as a two-layered or multilayered protective coating containing 0–75% volume of pores in the inner layers.

Further, the material may contain on the surface grains of tetragonal phases $(Mo,W)Si_2$ and/or $MoSi_2$ and/or $WSi_2$, and these phases have a predominant crystallographic orientation (texture) with crystallographic planes {001} parallel to the surface.

The essence of the invention is also in that an electric heater operating in an oxidative medium at temperatures of up to 1600–2000° C., consisting of a working portion and current lead-in wires manufactured from a "REFSIC" composite material comprising silicon carbide and silicides of molybdenum or of tungsten and/or of graphite and/or of other dense carbon material and/or of refractory metals or alloys thereof and/or of silicon carbide, is characterized in that applied as a protective coating to the working portion and to the current lead-in wires of the electric heater in the portion thereof subject to the effect of temperatures above 100–200° C. is a heat-resistant material according to claim 1, and the current lead-in wires and the working portion are interconnected by a soldered joint from a heat-resistant material according to claim 1, comprising suicides—solid solutions of $(Mo,W)_5Si_3$ and/or Novotný phases $(Mo,W)_5Si_3C$, as well as $(Mo,W)Si_2$ and silicon carbide with the ratio of the components (vol. %): $(Mo,W)_5Si_3$ and/or $(Mo,W)_5Si_3C$, 5-98; $(Mo,W)Si_2$, 2-95; silicon carbide, 0-55; the ratio of molybdenum and tungsten in the total weight of the refractory metals in the heat-resistant material being within (wt. %): Mo, 2-90; W, 10-98.

Furthermore, in the electric heater, at least to a portion of the surface protected from oxidation, a protective coating from the proposed material is applied to a sublayer of a protective coating from a "REFSIC" composite material containing silicon carbide and suicides of molybdenum and tungsten.

Furthermore, in the electric heater protection from oxidation on the working portion or on the working portion and on the maximum high-temperature portion of the current lead-in wires may be made from the proposed material of different structure and composition on different portions thereof, and the working portion and current lead-in wires may be joined by soldering, using the proposed material of different structure and composition on different portions.

The essence of the invention is also in that the electric heater operating in an oxidative atmosphere at temperatures of up to 1400–1600° C., consisting of a working portion manufactured from silicon carbide and current lead-in wires manufactured from a "REFSIC" material comprising silicon carbide and silicides of molybdenum or tungsten and/or graphite and/or other dense carbon material, may have on the current lead-in wires thereof, in their portion subject to the effect of temperatures above 100–200° C., as a protective coating, the proposed heat-resistant material is applied, and the current lead-in wires and the working portion may be interconnected by a soldered joint comprising silicides— solid solutions of $(Mo,W)_5Si_3$ and/or Novotný phases $(Mo,W)_5Si_3C$, as well as $(Mo,W)Si_2$ and silicon carbide with the ratio of the components (vol. %): $(Mo,W)_5Si_3$ and/or $(Mo,W)_5Si_3C$, 5-98; $(Mo,W)Si_2$, 2-95; silicon carbide, 0-55; the ratio of molybdenum and tungsten in the total weight of the refractory metals in the heat-resistant material being within (wt. %): Mo, 2-90; W, 10-98.

Furthermore, in the electric heater with a working portion from silicon carbide, protection from oxidation of the most high-temperature portion of the current lead-in wires may be joined by soldering, using the proposed material of different structure and composition on different portions thereof.

Furthermore, in the electric heater current lead-in wires may be made from graphite or other dense carbon material having a contact portion free from the protective layer.

Furthermore, in the electric heater current lead-in wires may consist of an envelope made from graphite or other dense carbon material and/or silicon carbide material and/or a "REFSIC" composite material comprising silicon carbide and suicides of molybdenum and tungsten, and a core located in the interior space of the envelope, said core being a current conductor made from a refractory metal or alloy, soldered with the envelope of the current lead-in wire throughout the length thereof with the help of the proposed heat-resistant material and having a protective coating from the proposed heat-resistant material on the current lead-in wire.

Furthermore, in the electric heater current lead-in wires may consist of an envelope made from graphite or other dense carbon material and/or silicon carbide material and/or a "REFSIC" composite material comprising silicon carbide and suicides of molybdenum and tungsten, and a core located in the interior space of the envelope, said core being a current conductor made from a refractory metal or alloy, soldered with the envelope of the current lead-in wire only at a distance of up to 10 mm from the place of soldering the current lead-in wire with the working portion, and the contact portion of the current lead-in wire being at the end of the current conductor made from a refractory metal, opposite to the place of soldering with the working portion.

Furthermore, in the electric heater the current conductor made from a refractory metal or alloy may be soldered in the interior space to the envelope of the current lead-in wire at a distance greater than 10 mm from the place of soldering the current lead-in wire with the working portion.

Furthermore, in the electric heater current lead-in wires may be made from a refractory metal or alloy with protection against oxidation with the help of the proposed material.

Furthermore, in the electric heater the working portion may be made of two branches interconnected by soldering with the proposed heat-resistant material either directly and/or with the help of one or more strips made from the "REFSIC" materials, provided with a protective coating from the proposed heat-resistant material and soldered to the working portions with the help of the proposed heat-resistant material, the resistivity of the strips being less than or equal to the resistivity of the branches of the working portion of the heater, and the cross-section of the strips being greater than or equal to the cross-section of the branches of the working portion.

Furthermore, in the electric heater the working portion may contain inserts made from "REFSIC" materials, which connect the current lead-in wire with the insert and the insert with the working portions by soldering with the help of the proposed heat-resistant material, the insert having a protective coating from the proposed heat-resistant material and the resistivity of the insert being smaller than or equal to the resistivity of the working portion of the heater, and the cross-section of the insert being greater than or equal to the cross-section of the branches of the working portion.

It is established experimentally that melts of molybdenum and tungsten suicides, based on eutectic compositions $Me_5Si_3$—$MeSi_2$ and $Me_5Si_3$—$MeSi_2$—$Me_5Si_3C$ are suitable for creating protective coatings on carbon, silicon carbide materials, refractory metals and their alloys, and on composite materials based on silicides of refractory metals and silicon carbide, and also for joining separate parts from these materials by soldering them into one part. Here the symbol Me is used to denote the solid solution of suicides of molybdenum and tungsten, which is formed, as we have established experimentally, after crystallization, in which as the elements substituting tungsten and molybdenum, other refractory metals (tantalum, niobium, titanium, zirconium, hafnium) may be present in amounts indicated in the patent claims.

The Novotný phase $Me_5Si_3C$=$(Mo,W)_5Si_3C$ is formed in the system Mo-W-Si-C and is characterized by a broader range of concentrations than the silicides $Mo_5Si_3$, $W_5Si_3$, and $MoSi_2$, $WSi_2$. Maximum deviations in the composition are observed for carbon. According to our estimates, relative changes in its concentration may occur in the region of −65 to +20% with regard to the traditional formulation $Me_5Si_3C$. For refractory metals and silicon these deviations do not exceed ±8%. The concentration boundaries for the existence of the Novotny phase in terms of carbon, silicon, and refractory metals in the heat-resistant material depend to the greatest extent on the combination of concentrations of its dopants. The Novotny phase is reliably identifiable with the help of x-ray powder analysis against the background of silicide phases $(Mo,W)_5Si_3$, $Mo_5Si_3$ and $(Mo,W)Si_2$, $MoSi_2$, $WSi_2$, differing from them by their atomic-crystalline structure. It is determined by the metallographic method (scanning electron or optical microscopy) together with the silicides $(Mo,W)Si_3$, $Mo_5Si_3$ and $W_5Si_3$. The phase has a higher strength than other refractory metal silicides entering into the composition of the heat-resistant material, this being especially noticeable at temperatures above 1000° C. Experimental results and testing of articles have shown that heat-resistant materials containing the Novotny phase withstand working temperatures of up to 1700–1900° C.

Novotny phases $Mo_5Si_3C$ and/or $(Mo,W)_5Si_3C$ are formed easily in displacement reactions (here Me=molybdenum or solid solution Mo—W):

$$5MeSi_2 + 7C \Rightarrow Me_5Si_3 + 7SiC \quad (1)$$

In this reaction the formation of the Novotny phase is accompanied by the formation of silicon carbide which also enters in this case into the composition of the protective coating and/or soldered joint. Carbon which is necessary for reaction (1) to proceed may be introduced preliminarily into the composition of materials to be melted, into the blank from which a part will be produced.

When the concentrations of carbon interacting with the eutectic silicide melt are small and it is in dispersed form, the Novotny phase may be formed in accordance with the resultant reaction

$$C + MeSi_3 \Rightarrow Me_5Si_3C \quad (2)$$

(here Me=molybdenum or solid solution Mo—W) without formation of silicon carbide. Carbon may be introduced into the melt zone as a product of thermal decomposition of hydrocarbons or carbon oxide from the furnace atmosphere directly in the process of preparing the proposed material or from carbon materials to which a coating is to be applied, from the composition of the binder of the slip mixture, if the latter contains organic compounds.

Due to the fact that the thermal expansion coefficients of the phases entering into the heat-resistant material are relatively close, $(3-10) \times 10^{-6}$ 1/deg, throughout the temperature interval of their existence in solid state, and that silicide phases manifest noticeable plasticity at temperatures above 1100° C., it is possible to select heat-resistant material compositions for making coatings and for soldering, which do not lead to the formation of cracks upon cooling the produced part and temperature cyclization thereof. The soldering and coating operations may be carried out either simultaneously or in any sequence. In this case it is possible to use the experimentally revealed melting point vs. composition dependences of the heat-resistant material. Thus, for melts close to the eutectic phase composition in the quasi-binary system $(Mo,W)_5Si_3 + (Mo,W)Si_2$, an increase in the amount of tungsten at the expense of molybdenum from 10 to 98 wt. % continuously rises the melting point of the material from approximately 1905 to 2020° C. Doping with rhenium, as a rule, makes it possible to lower to some extent the melting point of the heat-resistant material. Passing from more heat-resistant materials to less heat-resistant materials, it is possible to increase gradually the thickness of the coating, to make it multilayered. Soldering may be carried out at different stages of applying a two- or multilayered coating or simultaneously with applying some layer of the coating. All the phases cited in claim 1 are chemically compatible at temperatures lower than 1850° C., mutual solubility variations with temperature for the main components are insignificant, and this also contributes to the heat resistance of the heat-resistant material and to its stability in temperature cycling.

The use of complete or partial melting in soldering or in applying a protective coating from the proposed material leads to the formation of phases in subsequent crystallization: of solid solutions $(Mo,W)_5Si_3$ and $(Mo,W)Si_2$. Special techniques are required for preserving the phases $Mo_5Si_3$, $W_5Si_3$, $MoSi_2$, $Mo_5Si_3C$ in the composition of soldered joints, always in a smaller amount (to 90% of the volume fraction of the phases—solid solutions), than of the corresponding phases $(Mo,W)_5Si_3$ and $(Mo,W)Si_2$ and $(Mo,W)_5Si_3C$. In those cases when the phases $Mo_5Si_3$ and/or $W_5Si_3$ and/or $MoSi_2$ and/or $WSi_2$ and/or $Mo_5Si_3C$ are useful from the standpoint of matching the thermal expansion coefficients of the parts to be connected with the material of the soldered joint or the base material and the protective coating material, or, if they are useful for obtaining the required chemical properties of the coating, special measures should be taken for these phases not to become fully converted into solid solutions. Liquid-phase sintering or incomplete melting may be used for this purpose.

Cohesion of silicon carbide in "REFSICOAT" materials is undesirable, and cohesion at lengths of 500 μm and greater it is inadmissible: at temperatures above 1600–1700° C. silicon carbide, in the case of its appearance on the surface of a coating or soldered joint, will be subjected to accelerated gas corrosion. In material with coherent structure of silicon carbide will be able to propagate further from one grain of silicon carbide to another, wrecking first the soldered joint or protective coating and then the protected or solder-jointed materials. For "REFSIC" materials the cohesion of the silicon carbide or carbon constituent is absolutely necessary: it is just owing to it that "REFSIC" materials develop a skeleton which is able at temperatures of up to 2000° C. and higher to receive and resist external mechanical loads. As a result, "REFSIC" materials display heat-resistance essentially higher than in "REFSICOAT" materials.

There is no sharp boundary between the proposed heat-resistant materials and "REFSIC" materials, though they differ in their purpose, properties, composition and structure. In some cases the material can be assigned to the type "REFSIC" or "REFSICOAT" only after the cohesion of the silicon carbide component has been analyzed. Besides, in some cases after heat treatments above 2000° C. the silicon carbide component of "REFSICOAT" materials may acquire cohesion sufficient for the formation of a three-dimensional skeleton; the resulting material should be assigned already to the "REFSIC" family.

The choice for a particular practical problem of an optimal proportion between the main refractory metals entering into the composition of the material (molybdenum and tungsten) which are isomorphically interchangeable in the silicide phases—solid solutions $MeSi_2$ and $Me_2Si_3$, is connected with their different effect on the final properties of the obtained material. An increase in the concentration of molybdenum at the expense of tungsten makes it possible to obtain a more light-weight material with a higher heat resistance in air at a temperature of up to 1500° C. At temperatures below 1600° C. disilicides—solid solutions provide higher heat resistance than phases $Me_5Si_3$. At higher temperatures the heat resistance of phases $Me_5Si_3$ proves to be higher. An optimal proportion of the phases constituting the material depends on the temperature conditions of using thereof.

An increase in the relative proportion of tungsten at the expense of molybdenum increases the resistance to thermal shocks and improves the compatibility of the silicide component with the portions of the part made from carbon and silicon carbide materials in temperature cycling. An increase in the concentration of the silicide-doping elements indicated in the claims also increases the strength of the coating and soldered joint in different media for different temperature intervals. Doping also makes it possible to modify the microstructure of the heat-resistant material of the coating and soldered joint, to increase their mechanical properties at relatively low temperatures.

The use of tungsten and/or rhenium within the ranges indicated in the claims for substituting molybdenum in suicides $Me_5Si_3$ and $MeSi_2$ makes it possible to increase the heat resistance of the material. Molybdenum and/or rhenium in silicides make it possible to obtain heat resistance of the material within a broad range of temperatures. Tungsten and/or rhenium upon an increase of their amount in silicides with respect to molybdenum make it possible to raise resistance to thermal shocks. Besides, substituting molybdenum by tungsten and/or rhenium makes it possible to lower the thermal expansion coefficient of the material. The same effect may be obtained by an increase in the volume fraction of suicides $(Mo,W)_5Si_3$ and $(Mo,W)_5Si_3C$ at the expense of phases $(Mo,W)Si_2$. On doping with rhenium in amounts close to the upper limit indicated in the claims, rhenium suicides may be formed.

Including elements which actively bind oxygen: boron, aluminum, germanium, sodium, potassium, cesium, magnesium, calcium, barium, strontium, scandium, yttrium, lanthanum, and/or lanthanoids, manganese into the composition of the material in the indicated amounts makes it possible to vary such chemical and physical properties of the coating as its catalytic activity on oxidation in vacuum of 1–10 Pa, liability to "plague" (i.e., to degradation under gas corrosion conditions in the presence of oxygen and water vapors, usually during 1–100 hours, in the temperature range of 150–1200° C.), density, compatibility with the support in terms of the thermal expansion coefficient. The elements indicated here are predominantly in the form of their simple or complex oxides, including silicates. They may form combined oxides and silicates with molybdenum and tungsten, rhenium, other refractory metals entering into the composition of the material, and with each other. The formation of particular compounds occurs both during the preparation of the composition for applying the coating or for soldering and during its melting or during special oxidation roasting or in the course of service of finished coating in an oxidation medium. In such cases changes may take place in the chemical composition of compounds with the participation of the elements cited here, and their concentrations may vary within the limits indicated in the set of claims.

Oxides may be found both at the grain boundaries and within the pores in the inner layers and on the surface of the heat-resistant material. Oxides in the inner layers may be formed both in the process of deoxidation, in the reaction of introduced additives with oxygen contained either in the starting materials or in the furnace atmosphere. Additions may be introduced by using alloys prepared preliminarily by powder metallurgy techniques or with the help of preliminary smelting. It is also possible to introduce an oxide or silicate filler into the inner layers of the material, e.g., by powder metallurgy techniques. In the latter case a relatively large volume fraction of oxides, up to 25 vol. %, may be achieved in the material. As a result, such properties as the heat conductivity and electrical conductivity of the material, its corrosion resistance change markedly. This is particularly noticeable when materials have internal pores whose surface is covered with an oxide film.

Introducing vanadium chromium, iron, nickel and cobalt in the indicated amounts into the composition of the heat-resistant material makes it possible to decrease the liability to "plague" of the silicides and to increase the low-temperature strength of the heat-resistant material. Oxides of these metals may enter into the composition of the inner and outer silicate layer of the coating, imparting an increased resistance to it.

The use of fine-grained slip mass or high crystallization rates in combination with doping makes it possible to obtain fine-grained structure of the silicide phases of the coating (smaller than 80 μm in cross-section) and of the soldered joint, and thereby to enhance the mechanical properties of the obtained heat-resistant material.

Introducing silicon carbide into the composition of the heat-resistant material, which for the most part forms non-connected or only relatively short connected regions, usually shorter than 500 μm, with grain size preferably smaller than 50 μm, makes it possible to increase the allowable thickness of the coating and of the soldered joint owing to better matching of the thermal expansion coefficients of the materials of the support and coating, of the solder and portions of the part to be jointed for the range of values of the thermal expansion coefficients of $(4-7)\times10^{-6}$ 1/deg. With the silicon carbide content of 0-55 vol. %, it is possible to preserve sufficient fluidity of the melt of the heat-resistant material and thus to provide adhesion of a sufficiently thick coating and soldering of the parts to be jointed without formation of cracks. Maximum fluidity is displayed in compositions close to eutectics $(Mo,W)_5Si_3+(Mo,W)Si_2$.

Using two-layered or multilayered protective coatings and soldered joints, it is possible to select "stepwise" the contrast in the thermal expansion coefficients between the base material and the heat-resistant material of the coating. Layers of the heat-resistant material may be applied sequentially, using oriented crystallization of sequentially applied coatings in accordance with slip technology or sintering of layers during high-temperature treatments in vacuum, in a protective medium or in air. The layered structure of the heat-resistant material helps to improve its properties, using the advantages in the properties of each of the layers. For instance, the heat-resistant material constituting a protective coating on an electric heater in which a thicker electroconductive inner layer is coated with a layer which is less electroconductive but more stable to the effect of electric shocks, will ultimately combine the advantages of both layers.

Roasting in air or in other oxidizing medium promotes formation of the course of roasting of an outer silicate coating layer constituted, in amounts indicated in the set of claims, by silicon oxides and oxides of at least one from the group of elements: boron, germanium, aluminum, zinc, bismuth, lithium, sodium, potassium, cesium, magnesium, calcium, strontium, barium, scandium, yttrium, lanthanum and/or lanthanoids, titanium, zirconium, hafnium, tantalum, niobium, manganese, iron, vanadium, chromium, nickel, cobalt, molybdenum, tungsten and rhenium.

The composition of the surface oxide film and of the inner oxide phases may be formed both in the course of roasting the heat-resistant material in air or in other oxidizing medium ("natural" oxide coating and oxide phases) or may be regulated substantially wider owing to the provision of special "synthetic" oxide coatings and fillers. After the formation of inner layers of the material, in the final steps of preparing products for use, their surface is covered, by using slip or spray deposition technology, either with a frit powder having a required composition, prepared beforehand, or a mixture of oxides and/or carbonates (or other compounds easily decomposable under heating, preferably giving an oxide residue under technological conditions). For producing a "synthetic" coating, it is possible to use a slip containing, along with oxides, suicides of molybdenum and tungsten. The layer obtained after the roasting forms on the surface a silicate coating with a glass-like or partially crystalline structure.

When the proposed heat-resistant material is applied to refractory metals or their alloys for creating a protective coating thereon or soldering thereof, diffusion processes occur in the adjacent layers. A composition of sublayers is formed, more rich in the base metal, according to the state diagrams, than the layer of the main protective coating or of the soldered joint. For applying protective coatings to refractory metals or for soldering refractory metals having relatively low melting points (e.g., niobium, molybdenum and their alloys) with the help of the "REFSICOAT" material, it may be expedient preliminarily, before applying the basic coating, to apply a sublayer enriched with silicides of a more refractory metal (for instance, tungsten and tantalum or alloys thereof).

Low-temperature portions of electric heaters (lead-in wires, contact units, measuring electrodes) and parts may be soldered to high-temperature portions with the help of a melt of temperature-resistant material, having a protective coating from the proposed heat-resistant material only on a portion of their surface and having on the remaining portion thereof a different protective coating, e.g., based on silicon carbide and silicate systems. No protective coating is applied to the contact portions of the lead-in wires of electric heaters made from graphite (or other carbon materials) or of the lead-in wires from temperature-resistant metals and their alloys in that portion thereof where their service temperature does not exceed 100–200° C. As a result, the contact portions have a low contact resistance stable during service.

It should be noted that different terms may be used in the literature for denoting the same portions and parts of the electric heaters: working or active part; current lead-in wires, lead-out wires or lead-out parts.

The inner layers of the coating, containing pores, make it possible to increase the heat resistance of the coating and the temperature difference within the coating both under the heating-cooling conditions and under the steady-state operation conditions of the part cooled from the inside.

We have established experimentally that the rate of gas corrosion for coatings containing grains of tetragonal phases $(Mo,W)Si_2$ and/or $MoSi_2$ and/or $WSi_2$ on the surface (in a layer having a thickness of from one to several characteristic cross-sectional sizes of silicide grains) in the case when these phases have a predominant orientation (texture) with crystallographic planes {001} parallel to the surface may be reduced several-fold. The texture was studied experimentally with the help of pole figures {002} in the characteristic monochromatized radiation of molybdenum. A counter with the slit width of 4 mm was set for Wulff-Bragg double angles in the range of 10.2–10.4°, which made it possible to record the diffraction simultaneously of all the phases cited here with the structure of tetragonal molybdenum disilicide. With the help of oriented crystallization of the protective coating from the heat-resistant material, it was possible to obtain therein the indicated structure of disilicide phases. The predominant crystallographic orientation in this case can be characterized by that crystallographic planes {001} of disilicides proved to be parallel to the surface of the coating. With the angular deflection through 15° the diffraction intensity lowered more than ten-fold, and with deflection angles greater than 25° at least than twenty-fold, compared with the maximum corresponding to the angle of deflection from the surface of the coating equal to 0°.

The phase and chemical composition of the layers is chosen proceeding from the requirement of maximum closeness of deformations [A. G. Pomashin, V. V. Vikulin, Scientific Principles of Designing and Creating Ceramic Parts for Engines, in: "Nauka Proizvodstvu" No. 9, 1999, pp. 8–13] in simultaneous thermal expansion of the materials of the bases and coatings of parts to be jointed by soldering. In the case of nonuniform heating or under steady-state conditions of the article operation in a nonuniform temperature field, temperature maximum is reached in the outer layers of the coating on one of the part portions. Temperature difference may reach, depending on the operating conditions of the part, several thousands of degrees. In that case the deformation values caused by nonuniform heating should be matched at the expense of thermal expansion of the layers of the heat-resistant material in the form of a coating or soldered joint and other portions of the part involved.

It is expedient to manufacture current lead-in wires for electric heaters from materials having high electroconductivity. This decreases power losses for heating current lead-in wires as such, makes it possible to use current lead-in wires of smaller cross-section, reducing heat losses from the operating furnace at the expense of the heat conductivity along the lead-in wires. In our case, the best materials for lead-in wires are graphite (or other dense carbon material) or refractory metals and their alloys. Significant advantages of graphite as such material are its low contact resistance and high stability of contacts under heavy current loads. By manufacturing current lead-in wires consisting of envelopes made from graphite or other dense carbon materials possibly containing silicone carbide materials impregnated with silicides) protected by the proposed material against oxidation at high temperatures and cores consisting of refractory metals and their alloys, it is possible to obtain a combination of a high current transmission capacity, low contact resistance, and low heat conductivity of the lead-in wire. The core should be soldered to the envelope either all over the length thereof or only within separate portions, but the envelope is tightly sealed against the penetration of hot gases. In the relatively cold portion of current lead-in wires hermetic sealing of the core is not obligatory. If necessary, the contact end of the core located in the cold zone of the lead-in wire may be coupled directly to input leads either with the help of adapters with clamps or by welding. If soldering of the lead-in wire to the working portion or insert is performed simultaneously, the place of soldering is spaced to 10 mm apart from the place of soldering the lead-in wire to the connection strap or working portion, and the metallic core extends almost all over the length of the lead-in wire. But often it proves quite sufficient to diminish sharply the electric resistance of the lead-in wire and, consequently, electric losses therein, only within a portion of the lead-in wire, adjacent to the contact portion. In that case the metallic conductor should be soldered to the envelope at a distance of 10 mm and more from the place of soldering the lead-in wire to the working portion or insert.

Lead-in wires may be arranged parallel, opposite, at angle to each other, or coaxially. With the help of the "REFSICOAT" and "REFSIC" materials it is possible to embody most diverse structures of heaters operating with the working portions arranged not only vertically, but also horizontally or in any other manner.

Using inserts from the "REFSIC" material as junctions from the working portions to the lead-in wires makes it possible to increase the service life of the heater. As a rule, the length of inserts corresponds to the span of the junction on the furnace heat insulation from the temperature inside the furnace to 1200–1300° C. on its heat insulation. Such inserts are provided with a protective coating and soldered joints from the proposed "REFSICOAT" material.

Straps made from the "REFSIC" material, which connect separate branches of the working portion make it possible to obtain complicated configurations of the working portions of heaters, to augment the length of the working portion. Such straps are provided with a protective coating and soldered joints from the proposed "REFSICOAT" material.

With the help of the proposed material and by using connection straps from the "REFSIC" material potential uses of heaters from manufactured from silicon carbide can be substantially broadened. In addition to advantages connected with the provision of relatively small-sized lead-in wires, the use of connection straps and soldering makes it possible to broaden drastically the range of forms and sizes of silicon carbide electric heaters.

In most cases the proposed heat-resistant material, coatings made therefrom or soldered joints in which it is a constituent are prepared by the oriented crystallization process. In some cases it is expedient to use foundry technology, usually if the melt in its composition is close to eutectic and contains less than 25 vol. % of excess phase. The process of liquid-phase sintering of the blank produced in accordance with the powder technology is expedient, if the composition corresponds to 3-15 vol. % of molten eutectic of silicide phases at the sintering temperature. Working temperatures of the carried out processes are within the range of 1850–2200° C.

EXAMPLE 1

A part fully made from heat-resistant material. A feed charge was prepared by powder metallurgy techniques from powdered tungsten with additions of potassium and aluminum (in the total amount of 0.03 wt. %), powders of molybdenum, silicon, rhenium and ferromanganese. After melting the charge at 2040° C. it was cast into a one-time presintered thin-walled mold made from ceramic based on aluminum oxide (with addition of titanium and zirconium oxides). The blank in the form of a 30×8×80 mm plate obtained after crystallization and cooling to room temperature had the following phase composition: phases—solid solutions $(Mo,W)_5Si_3$, 43 vol. %; phases—solid solutions $(Mo,W)Si_2$, 47 vol. %. Mean porosity, 10%. The content (in wt. %): molybdenum, 86; tungsten, 10; rhenium, 1.5; iron, 0.6; manganese, 0.18; potassium+aluminum, 0.012; the balance being uncontrollable admixtures. After polishing the blank to final dimensions of 28×5×77 mm a shutter for interrupting a plasma beam in a test plant was obtained. At a distance of 80 mm from the plasma source with the energy flux density to 5000 kW/m² the shutter withstood up to 80 beam interruptions at a maximum temperature on the surface of up to 1850° C.

EXAMPLE 2

A part fully made from heat-resistant material. A part in the form of a 7×7×80 mm bar was obtained by sintering at 1700–2080° C. in vacuum for 1 hour of a compacted powder blank having the composition: 97 vol. % $(Mo,W)_5Si_3$+3 vol. % $(Mo,W)Si_2$. The process of preparing the starting powder comprised the step of combined reduction of tungsten and molybdenum from oxides with subsequent synthesis of silicides in the atmosphere of hydrogen at temperatures of up to 1600° C. Silicides—solid solutions contained 98 wt. % tungsten and 2 wt. % molybdenum. The obtained part had the mean porosity of about 17%, the grain size was smaller than 80 μm. The sample withstood 2-minute roasting in the atmosphere of air on a plasmatron at 2050° C. with a mean heating rate of 70° C./sec without destruction with a weight loss less than 2 mg/cm². As a result, a coating was formed on the surface, containing on an average 99.4 wt. Of silicon dioxide and 0.6 wt. % of molybdenum and tungsten oxides. The obtained part had a high heat-resistance and withstood without destruction 15 temperature-cycle tests with said heating rate and a cooling rate close thereto.

EXAMPLE 3

A part made from refractory metal, fully coated with heat-resistant material. A blank in the form of a cylinder 10 mm in diameter and 18 mm in height was made from a sintered powder tungsten-20% molybdenum alloy. Owing to wetting with a supplied melt containing molybdenum, tungsten, tantalum and silicon, under oriented crystallization conditions, a protective coating was formed all over the blank surface, 0.6–1.2 mm thick, containing 58% tungsten, 25% molybdenum and 17% tantalum in phases $(Mo,W)_5Si_3$ (69 vol. %)+$(Mo,W)Si_2$ (31 vol. %). The obtained part after polishing its end faces with diamond dust having grain size of 40/28 μm to the height of 19.0 mm was used as a support for firing ceramics based on aluminum, titanium and zirconium oxides at s temperature of 1650–1750° C. in an induction furnace. The characteristic loss in weight rate under steady-state conditions is 0.2 mg/cm² per hour.

EXAMPLE 4

A part made from carbon material, not fully coated with heat-resistant material and containing no soldered joints. A support from a carbon—carbon composite material was coated by using slip technology on one of the surfaces with a preliminarily prepared mixture of a silicon carbide powder (32 wt. %) having a mean grain size of 120 μm and silicide powders (68 wt. %) having a grain size of 20–75 μm, containing molybdenum, tungsten and silicon. Molybdenum and tungsten were in the ratio of 12 and 88 wt. %. In the total mass of the silicide mixture 19% of silicon accounted for 81% of refractory metals. The obtained mixture was applied with the help of a binder based on an aqueous solution of polyvinyl alcohol to an initial thickness of about 2.5 mm. After heat treatment in vacuum at a temperature of 2000–2150° C. a porous dense silicon carbide coating containing silicides of refractory metals, including Novotny phases, was formed on the surface of the support. Slip was applied for a second time with the help of a powder mixture of silicides, similar to that described above, but with a different content of the components: molybdenum and tungsten were in the ratio of 61 and 39 wt. %, silicon carbide was absent. In the silicide mixture 23 wt. % of silicon accounted for 77 wt. % of refractory metals. At 1930° C. under the oriented crystallization conditions there was formed an outer dense layer of silicides—solid solutions $(Mo,W)_5Si_3+(Mo,W)_5Si_3C$ and $(Mo,W)_5Si_2$, 56 and 44 vol. %, respectively, having a thickness of about 1100 μm. On the outer layer in tetragonal silicides $(Mo,W)Si_2$ a sharp crystallographic texture with crystallographic planes {001} parallel to the coating surface was formed. Porosity of the inner layer, having a thickness of about 1 mm, containing silicon carbide, $(Mo,W)_5Si_3$ and Novotny phase $(Mo,W)_5Si_3C$, $(Mo,W)Si_2$, respectively, in the ratio of 43, 38 and 19 vol. % (with 30% $(Mo,W)_5Si_3$ and 8% Novotny phase), the porosity was about 30%. The oxide outer layer of the coating was prepared with firing the applied frit in air and contained (in wt. %): $SiO_2$, 63; $K_2O$, 12; $Y_3O_3$, 14; $Al_2O_3$, 6; SrO, 5. The obtained one-side coating having a total thickness of 2.2–2.5 mm displayed a high heat resistance in the temperature range of 300–1800° C. under oxidation conditions. Other portions of the part were not under oxidation conditions or were not subjected to heating above 300° C. or were coated with a borosilicate coating containing silicon carbide.

EXAMPLE 5

An electric heater with a working part from "REFSIC" composite material, made with the use of the proposed heat-resistant material (soldering and a protective coating). A graphite lead-in wire of an electric heater was coupled to its working (active) member based on the "REFSIC" composite material "refractory metal suicides—silicon carbide" with the help of a solder having the composition (in wt. %): molybdenum, 47; tungsten, 30; silicon, 23 (the weight ratio of molybdenum and tungsten was 61 and 39%). In the soldered joint having a thickness of 0.2–1.4 mm $(Mo,W)_5Si_3$ and $(Mo,W)Si_2$ phases were present in the ratio of 53 and 47 vol. %. The protective coating having a thickness of 1.5–3 mm on the graphite lead-in wire had the same tungsten/molybdenum ratio and the phase composition (in vol. %): silicon carbide, 8; $(Mo,W)_5Si_3$ phase, 19%; and Novotny phase $(Mo,W)_5Si_3C$, 49, in total 68%; $(Mo,W)Si_2$, 24. The cross-section of silicon carbide particles was 5–10 μm. The silicide part of the protective layer was additionally coated with an external oxide layer containing (in wt. %): $SiO_2$, 60.3; $K_2O$, 17.3; ZnO, 17.9; $Al_2O_3$, 4.5. The contact portion of the graphite lead-in wire, 25 mm long, was left free of any coating.

EXAMPLE 6

An electric heater within a working part from "REFSIC" composite material, made with the use of the proposed heat-resistant material (soldering and a protective coating). Same as in Example 5, but a slip coating having a thickness of 600–1200 μm, containing phases $(Mo,W)_5Si_3$, $(Mo,W)Si_2$ (the molybdenum/tungsten weight ratio being 85 and 15%) and $MoSi_2$ in the vol. % ratio of 5, 74 and 21, was applied to the surface of the working portion. The cross-section of the silicide phase grains did not exceed 80 μm. The silicide part of the protective layer was additionally coated with an external oxide layer, containing (in wt. %): $SiO_2$, 46; $K_2O$, 27; CaO, 13; $Al_2O_3$, 14. The active portion withstands rapid heating and long-time operation in air at a temperature of up to 1780° C.

EXAMPLE 7

A part containing a soldered joint made with the use of heat-resistant material and not fully coated with a protective coating therefrom. 0.5 mm-diameter wires made from a tungsten-20% rhenium alloy were soldered to a sample of "REFSIC" composite material containing refractory metal silicides and silicon carbide for carrying out electric measurements with the help of a solder containing phases $(Mo,W)_5Si_3$, $(Mo,W)Si_2$ (the molybdenum/tungsten wt. % ratio being 92 and 8) in the 62 and 38 vol. % ratio. The thickness of the soldered joint was 0.03–0.4 mm, the thickness of the protective coating was 0.02–0.9 mm. At a distance greater than 6 mm from the place of soldering the wire had no protective coating. The thus made potential contacts for studying the temperature dependence of the electric resistance of the sample of the composite material tolerated plastic bending at a distance greater than 15 mm from the place of soldering and made it possible to carry out short-time measurements on the sample heated to 1100–1800° C. The molybdenum/tungsten ratio in the soldered joint was 37 and 63 wt. %, respectively.

EXAMPLE 8

Manufacturing an electric heater with a working portion from silicon carbide material with a lead-in wire soldered with the help of a heat-resistant material, having protective coating from heat-resistant material on the lead-in wire only. A graphite lead-in wire of an electric heater of 7 mm in diameter was soldered to the working element of the electric heater made from silicon carbide on an alumina binder in the form of a tube with external and internal diameter of 14 and 6 mm, respectively, by using a solder of the following composition (in wt. %): molybdenum, 69; tungsten, 13; silicon, 18. In the soldered joint phases $(Mo,W)_5Si_3+(Mo,W)_5Si_3C$ and $(Mo,W)Si_2$ were present in the ratio of 56, 6 and 38 vol. %, respectively. The protective coating on the graphite lead-in wire having a thickness of 0.7–1.3 mm had the tungsten/molybdenum weight ratio of 27 and 73% with the phase composition (vol. %): silicon carbide, 19; phases $(Mo,W)_5Si_3$ (37%)+$(Mo,W)_5Si_3C$ (11%) in total 48%; $(Mo,W)Si_2$, 33. The cross-section of silicon carbide particles in the coating of the lead-in wire was 5–10 μm. The silicide part of the protective layer on the lead-in wire was additionally coated with an external oxide layer containing (in wt. %): $SiO_2$, 57; $K_2O$, 19; $Na_2O$, 4; $Y_2O_3$, 6; $Al_2O_3$, 5; CaO, 6; BaO, 3. The contact portion of the graphite lead-in and the working part from silicon carbide were left free of any coating. The produced electric heater with a relatively high resistance to working temperatures of 1000–1400° C. with small-size lead-in wires featured a reliable contact with input leads.

EXAMPLE 9

Manufacturing an electric heater with a working portion from silicon carbide material with a soldered lead-in wire having a protective coating from heat-resistant material. Same as in Example 8, but to the surface of the silicon carbide working portion there was additionally applied a slip protective coating (a first layer) of a heat-resistant material, having a thickness of 0.7 mm, containing, in the total mass of heat-resistant metals (in wt. %): tungsten, 72; titanium, 5; tantalum, 3; and molybdenum, 20. The coating contained silicide phases in the following ratio (in vol. %): $(Mo,W)_5Si_3$, 48; $(Mo,W)Si_2$, 25. The remaining part of the volume was occupied by pores (19%) and complex oxides containing silicon, yttrium, titanium, potassium, aluminum in the total amount of 3% of the weight of the coating. To the sintered surface of this layer of the coating a second layer was applied, consisting of a mixture of powders of suicides $(Mo,W)_5Si_3$ (75 wt. % molybdenum and 25 wt. % tungsten)

and MoSi$_2$ with silicon and aluminum oxides. After passing through the hot zone of an oriented crystallization plant, an external layer of the coating was formed on the working portion of the heater, which contained phases (Mo,W)$_5$Si$_3$, (Mo,W)Si$_2$ and MoSi$_2$ in the ratio of 53, 35 and 12 vol. %. The total content of yttrium, titanium, potassium and aluminum was about 4% of the weight of the coating. The total thickness of the coating was 1.1–2.5 mm. The heater tolerates long-term operation at 1600° C.

EXAMPLE 10

Manufacturing a part fully consisting of a heat-resistant material containing disilicides and Novotny phase. With the help of conventional powder metallurgy techniques a tube was produced φ20/φ8 (internal)×600 mm, containing 14 vol. % of Novotny phase (Mo, W)$_5$Si$_3$C and 86 vol. % of disilicides (Mo,W)Si$_2$. The tungsten/molybdenum ratio was 90 and 10%, respectively. Silicon carbide and silicides (Mo,W)$_5$Si$_3$ were not detected by x-ray techniques. After applying to the cylindrical surfaces and end faces of the tube, with the help of slip technology, a coating having a thickness of 600–1200 µm, consisting of a mixture of powders (Mo,W)Si$_2$ (75 vol. %)+(Mo,W)$_5$Si$_3$ (25 vol. %) with the main fraction of $^{60}/_{40}$ µm, with the same tungsten/molybdenum ratio as in the inner layers, the tube was used for supplying glass mass agitating air through the bottom opening in a glass-melting furnace.

EXAMPLE 11

An electric heater with a working portion from "REFSIC" composite material, produced with the use of heat-resistant material (soldering and a protective coating) and with a lead-in wire having a graphite envelope and a tungsten core. Same as in Example 6, the lead-in wire being provided with a graphite envelope having an external diameter of 9 mm and an internal diameter of 3 mm, with a total length of 125 mm, produced by soldering with a composition (Mo,W)Si$_2$ (55 vol. %)+(Mo,W)$_5$Si$_3$ (45 vol. %) (25 wt. % of tungsten and 75 wt. % of molybdenum) two semi-cylinders made of graphite, symmetrical with respect to the longer axis of the lead-in wire. A tungsten rod of 2.2 mm in diameter was tightly sealed into the envelope throughout the length thereof (up to the place of soldering with the working portion). The contact portion of the lead-in wire was made on the graphite envelope and had a boss 20 mm long and 15 mm in diameter.

EXAMPLE 12

An electric heater with a working portion from "REFSIC" composite material, produced with the use of a heat-resistant material (soldering and a protective coating) and with a lead-in wire having a graphite envelope and a tungsten core. Same as in Example 11, but the tungsten core was soldered from the contact portion to the place on the lead-in wire, spaced 50 mm from the place of soldering with the working portion, and the cut in the graphite envelope is closed with a strip of a composite material containing silicon carbide and molybdenum and tungsten silicides. The length of the strip coincided with the length of the lead-in wire from the working portion to the contact portion thereof. The thickness and width of the strip enabled the cut to be sealed after soldering.

EXAMPLE 13

An electric heater with a working portion from "REFSIC" composite material, produced with the use of heat-resistant material (soldering and a protective coating), provided with an insert between the working portion and lead-in wire. Same as in Example 12, but between the working portion of 3×4.5 mm in cross-section and the lead-in wire an insert is provided, which is soldered to said working portion and said lead-in wire has a cross-section of 6×6 mm and is made from the same material as the working portion.

EXAMPLE 14

An electric heater with a working portion from "REFSIC" composite material, produced with the use of heat-resistant material (soldering and a protective coating). Same as in Example 13, but between two branches of the working portion having a length of 170 mm a connecting strap is provided, which is soldered to said branches, has a cross-section of 3.5×4.5 mm, a length of 20 mm, and makes it possible to increase the overall length of the working portion to 360 mm. The heater is shown diagrammatically in FIG. 1, wherein 1 is a contact portion of a lead-in wire, 2 is a lead-in wire, 3 is a core, 4 is an insert, 5 is a branch of the working portion, 6 is a connection strap.

EXAMPLE 15

Figure 2:
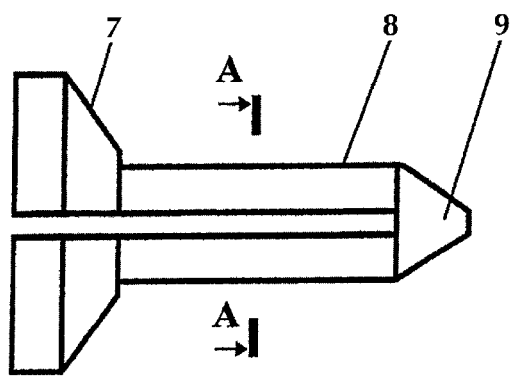
Figure 3:
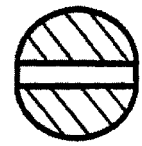

An electric heater for an electric soldering iron with a working portion from "REFSIC" composite material, produced with the use of heat-resistant material (soldering and a protective coating), provided with graphite lead-in wires. An electric heater comprises two parallel branches of a working portion from the "REFSIC" composite material. A 0.8 mm gap is provided between the branches, the front end of the branches is common and the rear end is split by cutting. Both branches are produced by incomplete cutting with a diamond cutting wheel having a thickness of 0.5 mm along the axis of symmetry of a blank which has the form of a cylinder having an external diameter of 6 mm and a length of 60 mm. On the front end of this cylinder, not subjected to cutting, a soldering bit is provided by polishing. The length of the uncut soldering pencil is 10 mm. The composition of the composite material "refractory metal silicides-silicon carbide" used for producing branches of the working portion is as follows: (Mo,W)$_5$Si$_3$+(Mo,W) $_5$Si$_3$C, 18 vol. %; (Mo,W) Si$_2$, 14 vol. %; predominantly bound silicon carbide, 61 vol. %; pores occupy 7% of the volume. The molybdenum/tungsten weight ratio is 29 and 71%. To the external surface a protective coating from the proposed heat-resistant material is applied, having the composition: (Mo,W)$_5$Si$_3$, 31 vol. %; (Mo,W)Si$_2$, 69 vol. %; molybdenum, 42 wt. %; and tungsten, 58 wt. %. The silicide part of the protective coating was additionally coated with an external oxide layer containing (in wt. %): SiO$_2$, 75; K$_2$O, 18; CaO, 5; Al$_2$O$_3$, 2. To the ends of the branches of the working portion, opposite to the soldering bit, two graphite lead-in wires were soldered. These lead-in wires did not contact each other, had the form of segments of a cylinder with an outer diameter of 18 mm and an inner diameter of 6 mm, were pulled over both branches of the working portion for 8 mm and fixed in that position by soldering. The front side of the lead-in wires is a part of a conical surface (see FIG. 2), wherein 7 are lead-in wires, 8 are two branches of the working portion, 9 is a soldering bit; FIG. 3 shows a section along A—A in FIG. 2. The graphite lead-in wires are jointed to the working portion by soldering with the help of the proposed heat-resistant material having the composition: (Mo,W)$_5$Si$_3$, 47 vol. %; (Mo,W)Si$_2$, 53 vol. %; 83 wt. % of molybdenum and 17 wt. % of tungsten. Each graphite lead-in wire had a length of 37 mm and was soldered only to one branch of the electric heater. On the end of the lead-in wires opposite to the working portion there is a contact portion for coupling to input leads. With the help of such an electric heater which can be rapidly warmed up in air to 1500–1600° C., it is possible to solder alloys of precious metals.

EXAMPLE 16

Figure 4:
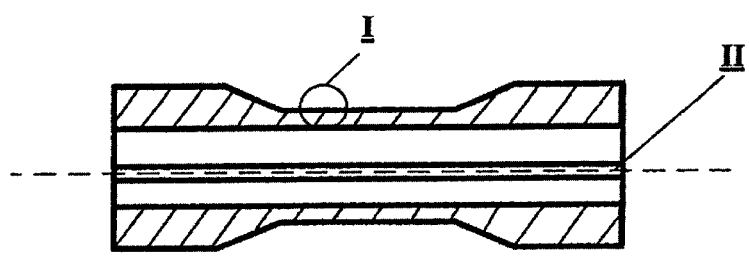
Figure 5:
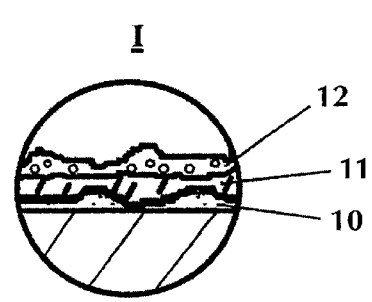

An electric heater based on graphite for use in a microfurnace adapted to investigate high-temperature processes in small samples. In a graphite tube having an outer diameter of 42 mm and an inner diameter of 24 mm, and a length of 240 mm a symmetrical 100 mm-long groove is provided in the middle portion along the outer diameter of 30 mm for a working portion. Two junctions between the groove and the tube edges are made in the form of conical grooves (with $\phi 40 \times \phi 30$) along the outer diameter, each 30 mm long. The tube halves cut with the help of a narrow cutter along the tube axis are interconnected by soldering with the proposed heat-resistant material of the composition: phases $(Mo,W)_5Si_3$, 47 vol. %; $(Mo,W)Si_2$, 53 vol. %, containing in the total mass 82% of molybdenum, 10% of tungsten and 8% of rhenium. Before jointing the halves into a tube by soldering, a three-layer protective coating was applied to the external and internal surfaces of the working portion and the conical junction (see FIG. 4 which shows diagrammatically an electric heater for a microfurnace operating in air). The first internal layer (see FIG. 4, layer I, I is a fragment of a multilayer protective coating, presented for an external layer, is enlarged in FIG. 4; 10 is an internal "REFSIC" layer, 11 is an intermediate silicide layer, 12 is an internal oxide layer of the coating) having a thickness of 200–400 $\mu m$, contains "REFSIC" composite material $(Mo,W)_5Si_3 + (Mo,W)_5Si_3C$, 21 vol. %; $(Mo,W)Si_2$, 24 vol. %; predominantly bound silicon carbide, 55 vol. %; the total content of molybdenum and tungsten, 75 and 25 wt. %, respectively. Applied thereto is a second 100–300 $\mu m$ thick layer from the proposed heat-resistant material $(Mo,W)_5Si_3$, 35 vol. %; $(Mo,W)Si_2$, 65 vol. % (see FIG. 4, layer II, II is a soldered joint between the halves of the heater) with the total content of molybdenum and tungsten being 85 and 15 wt. %, respectively. After soldering the halves along the length of the working portion and conical junction, a third layer (see FIG. 3, layer 3) of the protective coating is applied, having a thickness of 150–400 $\mu m$ and containing (in wt. %): $SiO_2$, 73; $K_2O$, 21; SrO, 3; $Y_2O_3$, 3. The external edges of the graphite tube which function as lead-in wires are secured in water-cooled contacts. The temperature in the interior of the tube in the middle of the working portion reaches 1600–1700° C.

What is claimed is:

1. A heat-resistant material comprising molybdenum and tungsten suicides $Me_5Si_3$ and $MeSi_2$ and silicon carbide, characterized in that it comprises suicides in the form of solid solutions $(Mo,W)_5Si_3$, $(Mo,W)_5Si_3C$ and $(Mo,W)Si_2$ with the following ratio of the components (in vol. %):

$(Mo,W)_5Si_3$ and/or $(Mo,W)_5Si_3C$ 5–98, $(Mo,W)Si_2$ 2–95, the ratio of molybdenum and tungsten in the total mass of the refractory metals in the heat-resistant material ranging within (in wt. %):

Mo 2–90,

W 10–98, the material comprising silicon carbide 0–55 vol. %.

2. A heat-resistant material according to claim 1, characterized in that it further comprises silicide $Mo_5Si_3$ and/or $W_5Si_3$ and/or $Mo_5Si_3C$ in a total amount of 0–90% of the total volumetric content of phases $(Mo,W)_5Si_3$ and/or $(Mo,W)_5Si_3C$, with the total volumetric content of 5-98 vol. % of phases $Mo_5Si_3$, $Mo_5Si_3C$, $(Mo,W)_5Si_3$ and $(Mo,W)_5Si_3C$, and/or phases $MoSi_2$ and/or $WSi_2$ in the total amount of 0–90% of the volumetric content of the phase $(Mo,W)Si_2$ with the total volumetric content of 2-95 vol. % of disilicides $MoSi_2$, $WSi_2$ and $(Mo,W)Si_2$.

3. A heat-resistant material according to claims 1, characterized in that it further comprises rhenium in an amount of 0–30 wt. % in at least one of the silicide phases $Mo_5Si_3$, $W_5Si_3$, $(Mo,W)_5Si_3$, $(Mo,W)_5Si_3C$, $Mo_5Si_3C$, $MoSi_2$, $WSi_2$, $(Mo,W)Si_2$.

4. A heat-resistant material according to claims 1, characterized in that it further comprises at least in one of the silicide phases $Mo_5Si_3$, $W_5Si_3$, $(Mo,W)_5Si_3$, $MOW_5Si_3C$, $MoSi_2$, $WSi_2$, $(Mo,W)Si_2$ one or more elements from the group comprising tantalum, niobium, titanium, zirconium, hafnium, with the following content of these metals, wt. %: Ta, 0-28; Nb, 0-18; Ti, 0-15; Zr, 0-19; Hf, 0-26. Near the upper limits of the indicated concentrations silicides of the above-cited metals may be present.

5. A heat-resistant material according to claim 1, characterized in that it comprises at least one of the elements which actively bind oxygen: boron, aluminum, germanium, sodium, potassium, cesium, magnesium, calcium, barium, strontium, scandium, yttrium, lanthanum, and/or lanthanoids, manganese, the total amount of these elements being within 0–12 wt. % of the weight of the entire heat-resistant material, and they are predominantly in the form of simple or complex oxides, including silicates, in silicate systems.

6. A heat-resistant material according to claim 1, characterized in that it comprises at least one element from the group comprising vanadium, chromium, iron, nickel and cobalt in a total amount of 0–5% of the weight of the entire material, said elements being in the form of their simple and/or complex oxides, including silicates, and/or in the form of alloys of these elements with silicon and/or with at least one of the following metals: tungsten, molybdenum, rhenium, tantalum, niobium, titanium, tantalum, zirconium and hafnium.

7. A heat-resistant material according to claim 1, characterized in that it contains grains of silicides having a cross-section smaller than 80 $\mu m$.

8. A heat-resistant material according to claim 1, characterized in that it is made two-layered or multilayered, with layers differing in the chemical composition, phase composition, and structure.

9. A heat-resistant material according to claim 1, characterized in that it is made in the form of a coating or soldered joint soldered joint for components of a part from refractory metals or alloys and/or carbon and silicon carbide materials and/or composite materials comprising suicides of refractory metals and silicon carbide, and its total thickness is within 0.02–10.0 mm.

10. A heat-resistant material according to claim 9, characterized in that it has an outer silicate layer containing 40–99.9 wt. % of silicon oxides, and also 0.1–60 wt. % in the sum of oxides of at least one of the following group of elements: boron, germanium, aluminum, zinc, bismuth, lithium, sodium, potassium, cesium, magnesium, calcium, strontium, barium, scandium, yttrium, lanthanum and/or lanthanoids, titanium, zirconium, hafnium, tantalum, niobium, vanadium, chromium, manganese, iron, nickel, cobalt, molybdenum, tungsten and rhenium.

11. A heat-resistant material according to claim 9, characterized in that it contains 0-75 vol. % of pores in the inner layers.

12. A heat-resistant material according to claim 1, characterized in that it contains on the surface grains of tetragonal phases (Mo,W)Si$_2$ and/or MoSi$_2$ and/or WSi$_2$, and these phases have a predominant crystallographic orientation (texture) with crystallographic planes {001} parallel to the surface.

13. An electric heater operating in an oxidative medium at temperatures of up to 1600–2000° C., consisting of a working portion and current lead-in wires manufactured from a "REFSIC" composite material comprising silicon carbide and suicides of molybdenum or of tungsten and/or of graphite and/or of other dense carbon material and/or of refractory metals or alloys thereof and/or of silicon carbide, characterized in that applied as a protective coating to the working portion and to the current lead-in wires of the electric heater in the portion thereof subject to the effect of temperatures above 100–200° C. is a heat-resistant material according to claim 1, and the current lead-in wires and the working portion are interconnected by a soldered joint from a heat-resistant material according to claim 1, comprising silicides—solid solutions of (Mo,W)$_5$Si$_3$ and/or Novotny phases (Mo,W)$_5$Si$_3$C, as well as (Mo,W)Si$_2$ and silicon carbide with the ratio of the components (vol. %) (Mo,W)$_5$Si$_3$ and/or (Mo,W)$_5$Si$_3$C, 5-98; (Mo,W)Si$_2$, 2-95; silicon carbide, 0-55; the ratio of molybdenum and tungsten in the total weight of the refractory metals in the heat-resistant material being within (wt. %): Mo, 2-90; W, 10-98.

14. An electric heater according to claim 13, characterized in that at least to a portion of the surface protected from oxidation, a protective coating from the proposed material is applied to a sublayer of a protective coating from a "REFSIC" composite material containing silicon carbide and silicides of molybdenum and tungsten.

15. An electric heater according to claims 13, characterized in that the current lead-in wires are made from graphite or other dense carbon material having a contact portion free of the protective layer.

16. An electric heater according to claims 15, characterized in that the current-conducting core made from a refractory metal or alloy is soldered in the interior space to the envelope of the current lead-in wire at a distance of up to 10 mm from the place of soldering the current lead-in wire with the working portion, and the contact portion of the current lead-in wire being at the end of the current conductor made from a refractory metal, opposite to the place of soldering with the working portion.

17. An electric heater according to claims 13, characterized in that the current lead-in wires consist of an envelope made from graphite or other dense carbon material and/or silicon carbide material and/or a "REFSIC" composite material comprising silicon carbide and suicides of molybdenum and tungsten, and a core located in the interior space of the envelope, said core being a current conductor made from a refractory metal or alloy, soldered with the envelope of the current lead-in wire throughout the length thereof with the help of the proposed heat-resistant material and having a protective coating from the proposed heat-resistant material on the current lead-in wire.

18. An electric heater according to claims 13, characterized in that the envelopes of the current lead-in wires are made from graphite or other dense carbon material and/or silicon carbide material and/or a "REFSIC" composite material comprising silicon carbide and silicides of molybdenum and tungsten, a current-conducting core made from a refractory metal or alloy being located in the interior space of the envelope, said core being soldered with the envelope of the current lead-in wire only at a distance of up to 10 mm from the place of soldering the current lead-in wire with the working portion, and the contact portion of the current lead-in wire being at the end of the current conductor made from a refractory metal, opposite to the place of soldering with the working portion.

19. An electric heater operating in an oxidative medium at temperatures of up to 1600–2000° C., consisting of a working portion and current lead-in wires manufactured from a "REFSIC" composite material comprising silicon carbide and silicides of molybdenum or of tungsten and/or of graphite and/or of other dense carbon material and/or of refractory metals or alloys thereof and/or of silicon carbide, characterized in that applied as a protective coating to the working portion and to the current lead-in wires of the electric heater in the portion thereof subject to the effect of temperatures above 100–200° C. is a heat-resistant material according to claim 1, and the current lead-in wires and the working portion are interconnected by a soldered joint from a heat-resistant material according to claim 1, comprising silicides—solid solutions of (Mo,W)$_5$Si$_3$ and/or Novotny phases (Mo,W)$_5$Si$_3$C, as well as (Mo,W)Si$_2$ and silicon carbide with the ratio of the components (vol. %): (Mo,W)$_5$Si$_3$ and/or (Mo,W)$_5$Si$_3$C, 5-98; (Mo,W)Si$_2$, 2-95; silicon carbide, 0-55; the ratio of molybdenum and tungsten in the total weight of the refractory metals in the heat-resistant material being within (wt. %): Mo, 2-90; W, 10-98, characterized in that it is made with a protection against oxidation on the working portion or on the working portion and on the maximum high-temperature portion of the current lead-in wires, made from the proposed heat-resistant material of different structure and composition according to claim 1 on different portions and also in which the working portion and current lead-in wires are connected by soldering with the use of the proposed material of different structure and composition according to claim 1 on different portions.

20. An electric heater operating in an oxidative atmosphere at temperatures of up to 1400–1600° C., consisting of a working portion manufactured from silicon carbide and current lead-in wires manufactured from a "REFSIC" material comprising silicon carbide and suicides of molybdenum or tungsten and/or graphite and/or other dense carbon material, characterized in that to the current lead-in wires thereof, in their portion subject to the effect of temperatures above 100–200° C., as a protective coating, the heat-resistant material according to claim 1 is applied, and in that the current lead-in wires and the working portion may be interconnected by a soldered joint from the heat-resistant material according to claim 1, comprising silicides—solid solutions of (Mo,W)$_5$Si$_3$ and/or Novotny phases (Mo,W)$_5$Si$_3$C, as well as (Mo,W)Si$_2$ and silicon carbide with the ratio of the components (in vol. %): (Mo,W)$_5$Si$_3$ and/or (Mo,W)$_5$Si$_3$C, 5-98; (Mo,W)Si$_2$, 2-95; silicon carbide, 0-55; the ratio of molybdenum and tungsten in the total weight of the refractory metals in the heat-resistant material being within (wt. %): Mo, 2-90; W, 10-98.

21. An electric heater operating in an oxidative atmosphere at temperatures of up to 1400–1600° C., consisting of a working portion manufactured from silicon carbide and current lead-in wires manufactured from a "REFSIC" material comprising silicon carbide and suicides of molybdenum or tungsten and/or graphite and/or other dense carbon material, characterized in that to the current lead-in wires thereof, in their portion subject to the effect of temperatures above 100–200° C., as a protective coating, the heat-resistant material according to claim 1 is applied, and in that the current lead-in wires and the working portion may interconnected by a soldered joint from the heat-resistant material according to claim 1, comprising silicides—solid solutions of (Mo, W)$_5$Si$_3$ and/or Novotny phases (Mo, W)$_5$Si$_3$C, as well as (Mo, W)Si$_2$ and silicon carbide with the ratio of the components (in vol. %) (Mo, W)$_5$Si$_3$ and/or (Mo, W)$_5$Si$_3$C, 5-98; (Mo,W)Si$_2$, 2-95; silicon carbide, 0-55; the ratio of molybdenum and tungsten in the total weight of the refractory metals in the heat-resistant material being within (wt. %): Mo, 2-90; W, 10-98, characterized in that it is made with protection against oxidation on the maximum high-temperature portion of the current lead-in wires, made from the proposed heat-resistant material of different structure and composition according to claim 1 on different portions and also in which the working portion and current lead-in wires are connected by soldering with the use of the proposed material of different structure and composition according to claim 1 on different portions.

22. An electric heater according to claim 21, characterized in that the current lead-in wires are made from a refractory metal or alloy with protection against oxidation with the help of the proposed heat-resistant material comprising molybdenum and tungsten silicides $Me_5Si_3$ and $MeSi_2$ and silicon carbide, characterized in that it comprises silicides in the form of solid solutions $(Mo,W)_5Si_3$ $(Mo,W)_5Si_3C$ and $(Mo,W)Si_2$ with the following ratio of the components (in vol. %):

$(Mo,W)_5Si_3$ and/or $(Mo,W)_5Si_3C$ 5-98, $(Mo,W)Si_2$ 2-95, the ratio of molybdenum and tungsten ratio in the total mass of the refractory metals in the heat-resistant material ranging within (in wt. %)

Mo 2-90,

W 10-98, the material comprising silicon carbide 0-55 vol. % on different portions.

23. An electric heater operating in an oxidative medium at temperatures of up to 1600–2000° C., consisting of a working portion and current lead-in wires manufactured from a "REFSIC" composite material comprising silicon carbide and silicides of molybdenum or of tungsten and/or of graphite and/or of other dense carbon material and/or of refractory metals or alloys thereof and/or of silicon carbide, characterized in that applied as a protective coating to the working portion and to the current lead-in wires of the electric heater in the portion thereof subject to the effect of temperatures above 100–200° C. is a heat-resistant material according to claim 1, and the current lead-in wires and the working portion are interconnected by a soldered joint from a heat-resistant material according to claim 1, comprising silicides—solid solutions of $(Mo,W)_5Si_3$ and/or Novotny phases $(Mo, W)_5Si_3C$, as well as $(Mo, W)Si_2$ and silicon carbide with the ratio of the components (vol. %): $(Mo,W)_5Si_3$ and/or $(Mo,W)_5Si_3C$, 5-98; $(Mo,W)Si_2$, 2-95; silicon carbide, 0-55; the ratio of molybdenum and tungsten in the total weight of the refractory metals in the heat-resistant material being within (wt. %): Mo, 2-90; W, 10-98, characterized in that the working portion is be made of two branches interconnected by soldering with the proposed heat-resistant material according to claim 1 either directly and/or with the help of one or more connection straps made from the "REFSIC" material, provided with a protective coating from the proposed heat-resistant material according to claim 1 on different portions and soldered to the working portions with the help of the proposed heat-resistant material according to claim 1 on different portions, the resistivity of the straps being less than or equal to the resistivity of the branches of the working portion of the heater, and the cross-section of the straps being greater than or equal to the cross-section of the branches of the working portion.

24. An electric heater operating in an oxidative medium at temperatures of up to 1600–2000° C., consisting of a working portion and current lead-in wires manufactured from a "REFSIC" composite material comprising silicon carbide and suicides of molybdenum or of tungsten and/or of graphite and/or of other dense carbon material and/or of refractory metals or alloys thereof and/or of silicon carbide, characterized in that applied as a protective coating to the working portion and to the current lead-in wires of the electric heater in the portion thereof subject to the effect of temperatures above 100–2000° C. is a heat-resistant material according to claim 1, and the current lead-in wires and the working portion are interconnected by a soldered joint from a heat-resistant material according to claim 1, comprising silicides—solid solutions of $(Mo,W)_5Si_3$ and/or Novotny phases $(Mo, W)_5Si_3C$, as well as $(Mo, W)Si_2$ and silicon carbide with the ratio of the components (vol. %): $(Mo,W)_5Si_3$ and/or $(Mo,W)_5Si_3C$, 5-98; $(Mo,W)Si_2$, 2-95; silicon carbide, 0-55; the ratio of molybdenum and tungsten in the total weight of the refractory metals in the heat-resistant material being within (wt. %): Mo, 2-90; W, 10-98, characterized in that the working portion contains inserts made from the "REFSIC" material, which connect the current lead-in wire with the insert and the insert with the working portions by soldering with the help of the proposed heat-resistant material according to claim 1 on different portions, the insert having a protective coating made from the proposed heat-resistant material according to claim 1 on different portions and the resistivity of the insert being smaller than or equal to the resistivity of the working portion of the heater, and the cross-section of the insert being greater than or equal to the cross-section of the branches of the working portion.

* * * * *